(12) United States Patent
Chou

(10) Patent No.: US 7,080,922 B2
(45) Date of Patent: Jul. 25, 2006

(54) FRAME OF CCFL ASSEMBLY

(75) Inventor: Chin-Wen Chou, Taipei Hsien (TW)

(73) Assignee: Zippy Technology Corp., Hsin-Tien (TW)

( * ) Notice: Subject to any disclaimer, the term of this patent is extended or adjusted under 35 U.S.C. 154(b) by 264 days.

(21) Appl. No.: 10/712,057

(22) Filed: Nov. 14, 2003

(65) Prior Publication Data
US 2005/0104498 A1    May 19, 2005

(51) Int. Cl.
*F21S 4/00*    (2006.01)
(52) U.S. Cl. ...................... 362/225; 362/260
(58) Field of Classification Search ............ 362/225, 362/224, 97, 240, 27, 606, 217, 219, 260; 349/70, 71, 64; 313/250; 345/102; 248/50
See application file for complete search history.

(56) References Cited
U.S. PATENT DOCUMENTS
6,783,256 B1 * 8/2004 Moon ..................... 362/241

2004/0047148 A1 * 3/2004 Kang et al. ............. 362/225

* cited by examiner

*Primary Examiner*—Ali Alavi
(74) *Attorney, Agent, or Firm*—Birch, Stewart, Kolasch & Birch, LLP

(57) ABSTRACT

A parallelepiped lamp frame comprises a support unit comprising a lower case and two support members on two sides of the lower case, each support member having a plurality of lengthwise spaced apertures; and an CCFL assembly comprising a plurality of parallel lamps each supported by a pair of opposite apertures wherein each aperture has an inner diameter larger than an outer diameter of the lamp, and the lamp is divided into a connecting portion projected from the support members, and an illumination portion. It is possible of replacing a malfunctioned lamp without detaching the upper case. Further, high temperature at both ends of the lamps can be reduced significantly by heat convection by exposing the connecting portion, thereby prolonging a useful life of the CCFL assembly.

10 Claims, 16 Drawing Sheets

FRAME OF CCFL ASSEMBLY

FIELD OF THE INVENTION

The present invention relates to frame of CCFL (cold cathode fluorescent lamp) assembly and more particularly to an improved frame of an CCFL assembly in which an inner diameter of the aperture of the support member is larger than an outer diameter of each lamp of the lamp assembly.

BACKGROUND OF THE INVENTION

LCDs (liquid crystal displays) are quickly replacing CRTs (cathode ray tubes) as monitors for desktop computers and TVs (televisions, i.e., LCD TVs) due to less space being occupied and low radiation for health reasons. An LCD comprises two parallel glass panels and liquid crystal contained therebetween. Also, a plurality of vertical and horizontal very thin wires are provided in either glass panel. An orientation of the liquid crystal molecules can be changed for deflecting rays and thus producing pictures by conducting the wires or not. This is a contrast to CRT which is a vacuum tube in which a stream of electrons are emitted from an electron gun and the stream of electrons can be further focused on a curved fluorescent screen coated with phosphor so as to produce lighted traces. LCD has the advantages of lightweight, compactness, and much lower radiation as compared to the well known electron gun.

However, LCD has one drawback of being shortened in useful life as compared to the well known CRT used as monitor of desktop computer. This can be illustrated in FIG. 1. As shown, an CCFL assembly 10 is served as light source of LCD. A black spot can be generated after a predetermined period of time of use. Undesirably, the black spot may adversely affect the light deflection. Following is a description of the wiring of the parallelepiped frame 1a and the voltage boost module (i.e., power supply) 30. For considering the slender, fragile properties of the CCFL assembly 10, a support member 12a is provided at either side of the lower case 11 prior to wiring. The lower case 11 and the support member 12a together form a support unit 2a. A plurality of spaced seats 21 are provided at an inner side of either support member 12a. The seat 21 is used as a fastening means of wire 20 of the CCFL assembly 10. A uniform film 111 is provided in the lower case 11 which is in turn secured to the upper case 50. The voltage boost module 30 comprises a piezoelectric pad 31 electrically coupled to the wires 20 at the seats 21 so as to supply power of high voltage to the CCFL assembly 10. A user has to detach the upper case 50 for replacing components in a case of the CCFL assembly 10 break or black spot generation. This can cause inconvenience in maintenance.

Moreover, as shown in FIG. 12, a lamp of the CCFL assembly 10 is divided into ten (10) sections in an experiment. The connecting portion 16 of the CCFL assembly 10 consists of an outer conductor 161 and an inner conductor 162. High heat will be generated by the CCFL assembly 10 when high voltage power is supplied to the inner conductor 162 in operation. As shown, a maximum temperature of 76 can be measured at one end of the inner conductor 162 when LCD is in use. Temperature of the inner conductor 162 decreases gradually toward its center (e.g., 40.). Heat dissipation of the CCFL assembly 10 is poor since it is completely enclosed by the upper and lower cases 50 and 11. This, in turn, may cause overheat of the frame 1a, resulting in a damage of the CCFL assembly 10. Hence, a need for improvement exists.

SUMMARY OF THE INVENTION

It is an object of the present invention to provide a lamp frame for facilitating a replacement of the malfunctioned lamp. The parallelepiped lamp frame comprises a support unit comprising a lower case and two support members on two sides of the lower case, each support member having a plurality of lengthwise spaced apertures; and an CCFL assembly comprising a plurality of parallel lamps each being supported by a pair of opposite apertures on the support members wherein each of the apertures has an inner diameter larger than an outer diameter of the lamp, and the lamp is divided into a connecting portion projected from the support members to be served as an electrical connection between the wire of the lamp and the voltage boost module, and an illumination portion. By utilizing the present invention, there is no need of detach the upper case in replacing a malfunctioned lamp. Rather, simply disconnect both the wire of the lamp and the voltage boost module from the connecting portion prior to the replacement since the connecting portion is projected from the support members. Thus, it is possible of easily replacing a malfunctioned lamp.

It is another object of the present invention to provide means for increasing heat dissipation capability of the CCFL assembly for prolonging a useful life of the lamps. For achieving this purpose, both ends of each lamp are projected from the support members. High heat will be generated by the CCFL assembly when high voltage power from the power supply is supplied to both ends of each lamp in operation, resulting in a higher temperature at both ends of the lamps. Advantageously, high temperature at both ends of the lamps can be reduced significantly by heat convection by configuring the illumination portion within the enclosed frame consisting of the secured upper and lower cases, and exposing the connecting portion.

The above and other objects, features and advantages of the present invention will become apparent from the following detailed description taken with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
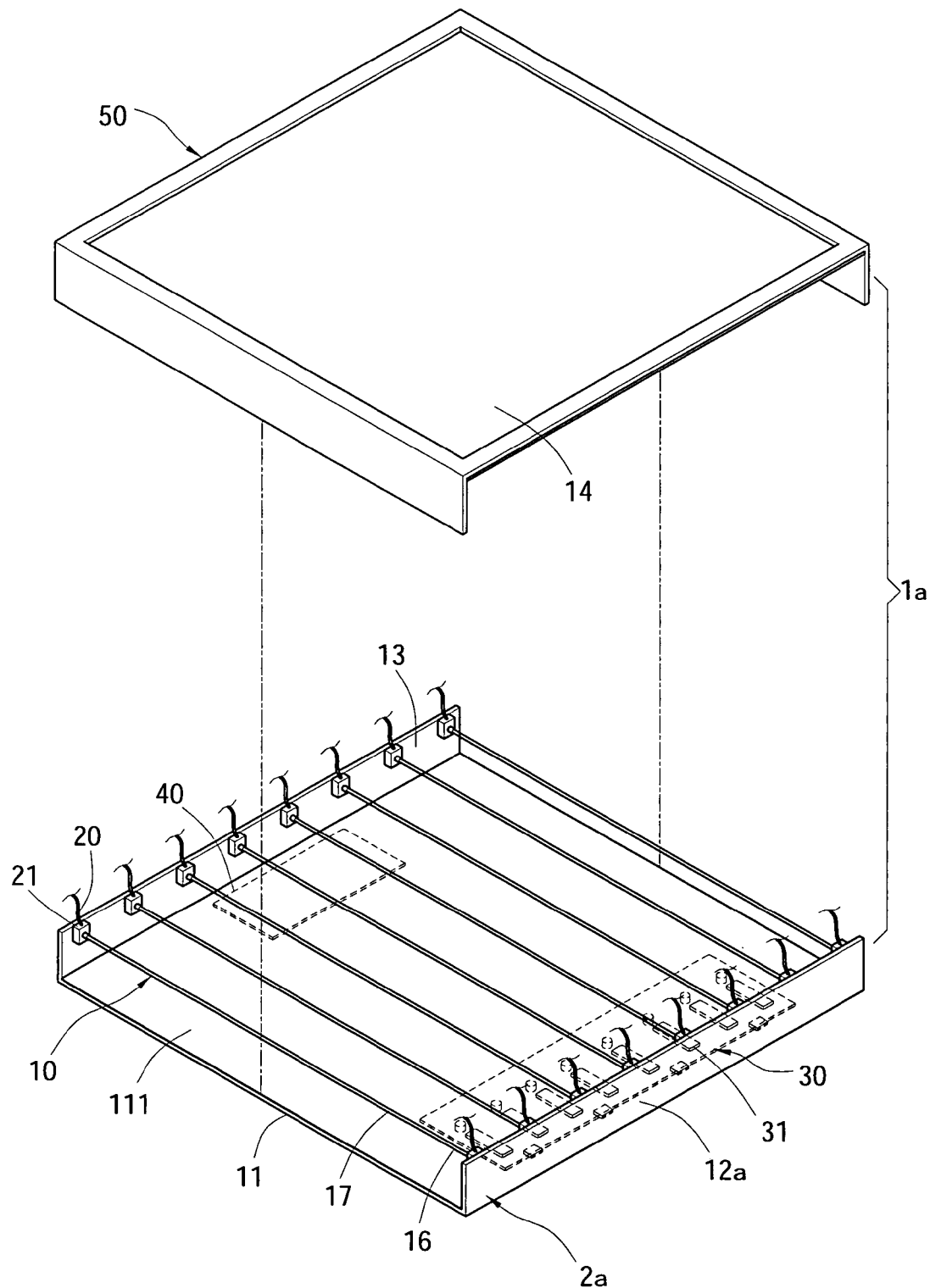
FIG. 1 is an exploded perspective view of a conventional CCFL assembly.
Figure 2:
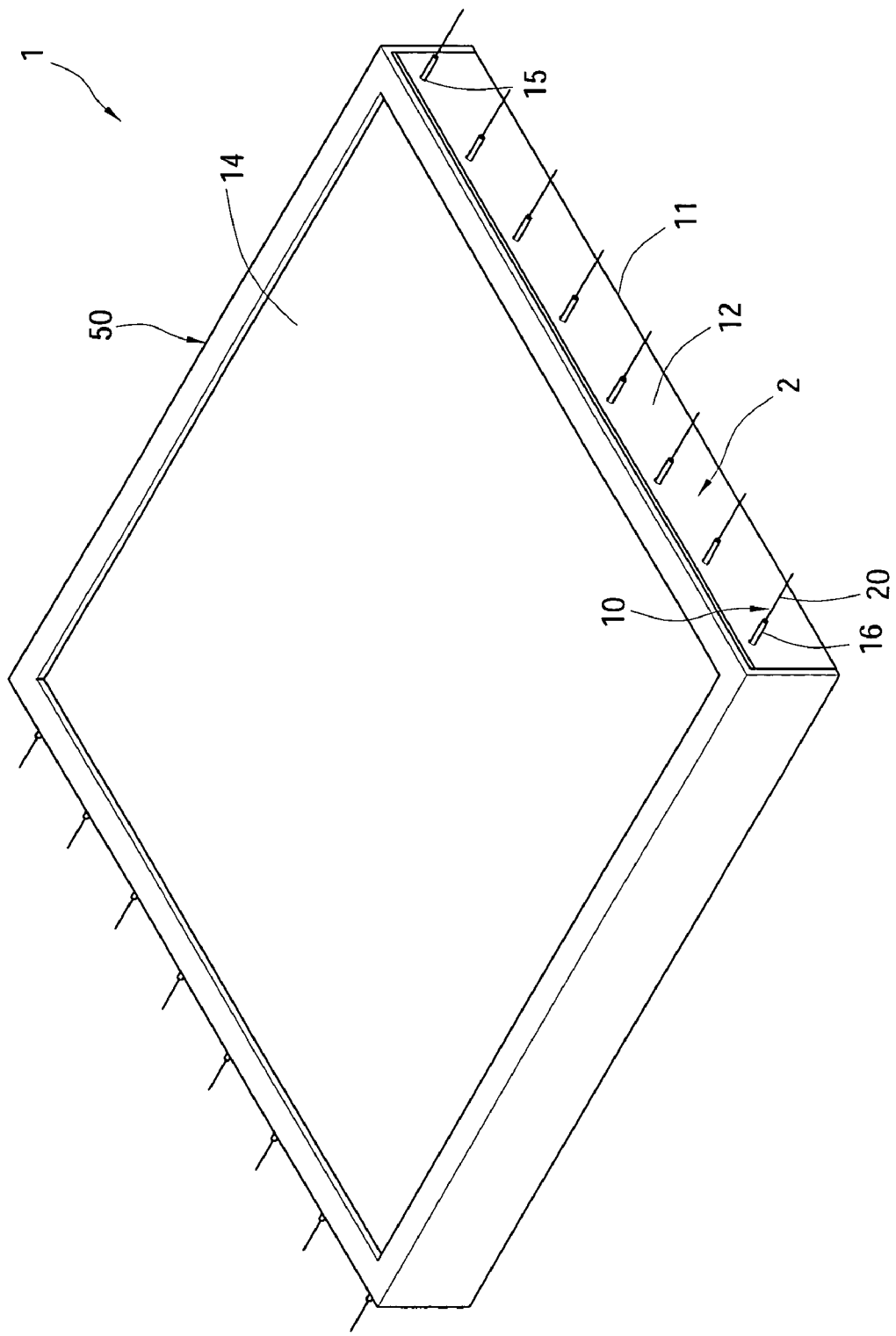
FIG. 2 is a perspective view of a first preferred embodiment of CCFL assembly according to the invention.
Figure 3:
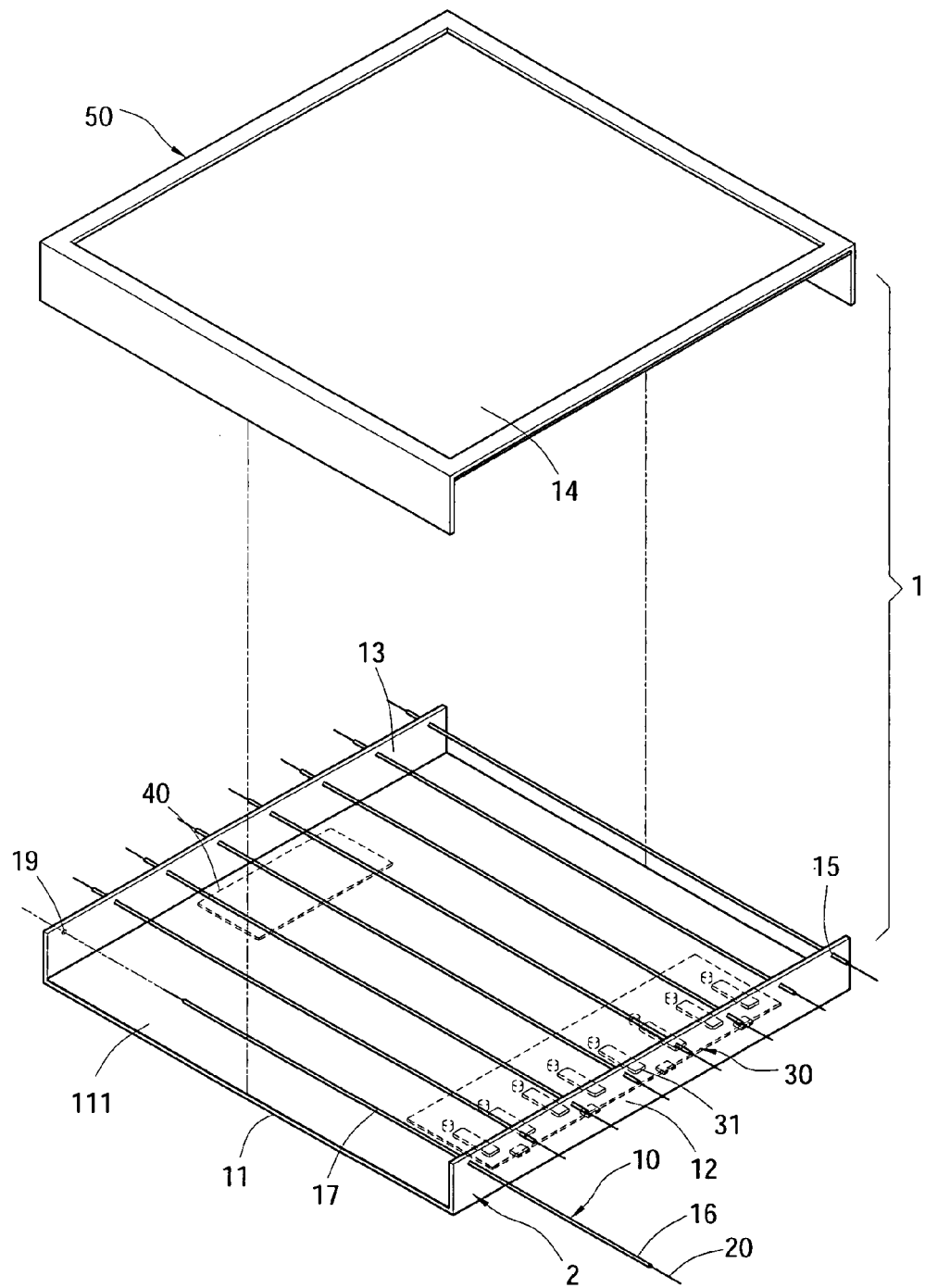
FIG. 3 is an exploded perspective view of the CCFL assembly shown in FIG. 2.

Referring to FIGS. 2 and 3, there is shown a frame 1 of an CCFL assembly 10 constructed in accordance with the invention. The frame 1 comprises a support unit 2 and an upper case 50. The support unit 2 comprises a lower case 11 and two opposite support members 12 and 13 on two sides of the lower case 11. The CCFL assembly 10 comprises a plurality of parallel lamps each being supported by an aperture 15 on the support member 12 and an aperture 19 on the other support member 13. Each of the apertures 15 and 19 has an inner diameter larger than an outer diameter of each lamp of the CCFL assembly 10. Hence, the CCFL assembly 10 can be disposed across the support members 12 and 13. Also, a fastener is used to secure the upper case 50 to the support unit 2. The fastener is either a screw or a latch. In the embodiment, the fastener is a latch. Further, the secured support unit 2 is enclosed by the upper case 50 with only two connecting portions 16 at both ends of each lamp of the CCFL assembly 10 being exposed. The connecting portion 16 consists of an outer conductor 161 and an inner conductor 162. A voltage boost module (i.e., power supply) 30 is provided in the lower case 11 proximate one support member 12. The voltage boost module 30 comprises a piezoelectric pad 31 electrically coupled to the wires 20 of the CCFL assembly 10 so as to supply power of high voltage thereto. In addition, a circuit board 40 is provided on a bottom of the support unit 2.

The support members 12 and 13 are disposed at both sides of the lower case 11. Also, a plurality of spaced apertures 15 are formed on the support member 12 and a plurality of spaced apertures 19 are formed on the support member 13 wherein each lamp of the CCFL assembly 10 is disposed across a pair of opposite apertures 15 and 19 and is above the bottom of the lower case 11 by a predetermined distance. The lamp of the CCFL assembly 10 is divided into a connecting portion 16 and an illumination portion 17 by the support members 12 and 13. The connecting portions 16 are projected from the support members 12 and 13 and are served as an electrical connection between the wires 20 and the voltage boost module 30. The illumination portions 17 (i.e., light source) are disposed between the support members 12 and 13. A uniform film 111 is provided above the lower case 11 by a predetermined distance. Additionally, a light guide plate 14 is provided on an inner surface of the top of the upper case 50.

Figure 4:
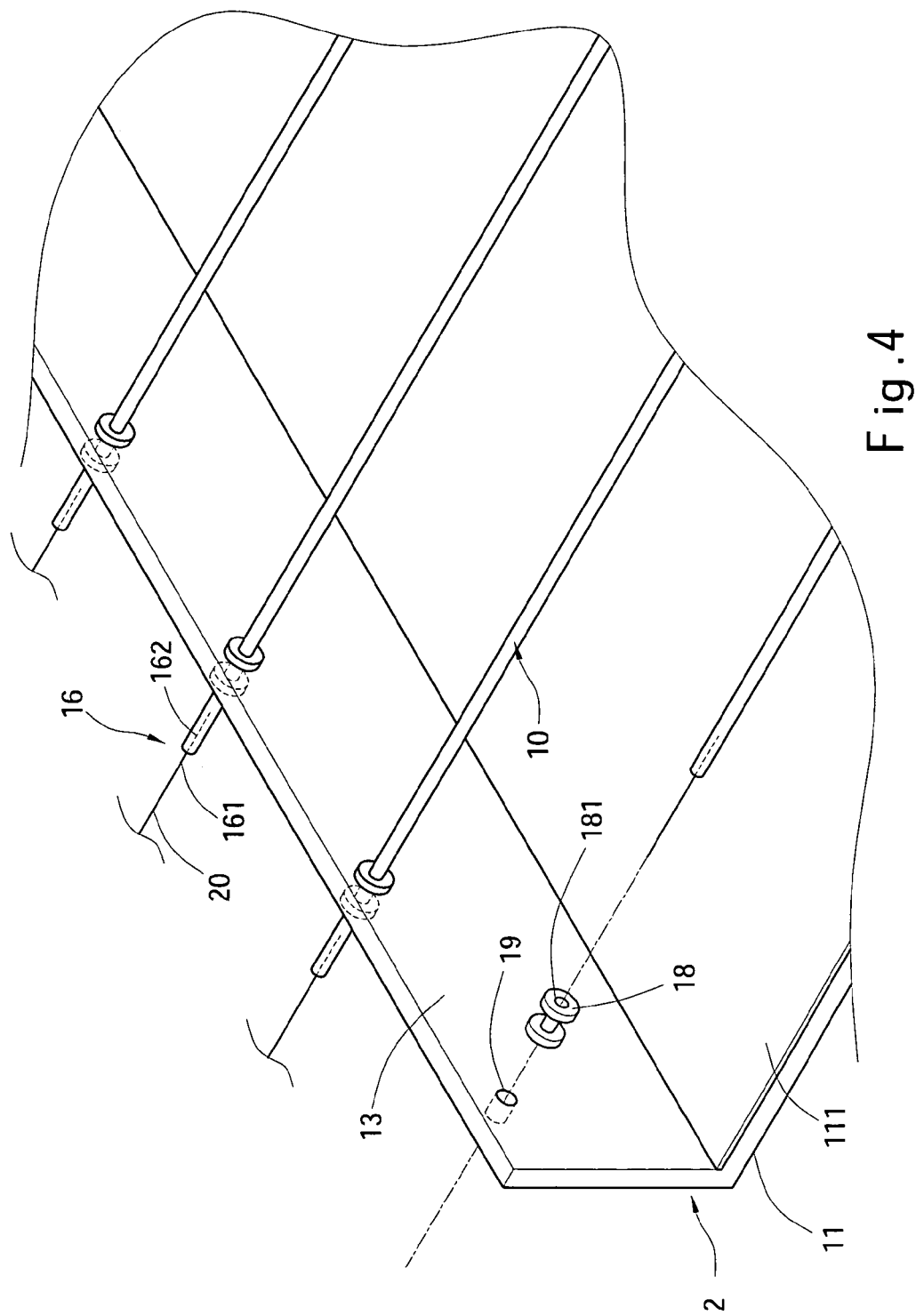
FIG. 4 is a greatly enlarged view of a portion of the CCFL assembly shown in FIG. 3.
Figure 5:
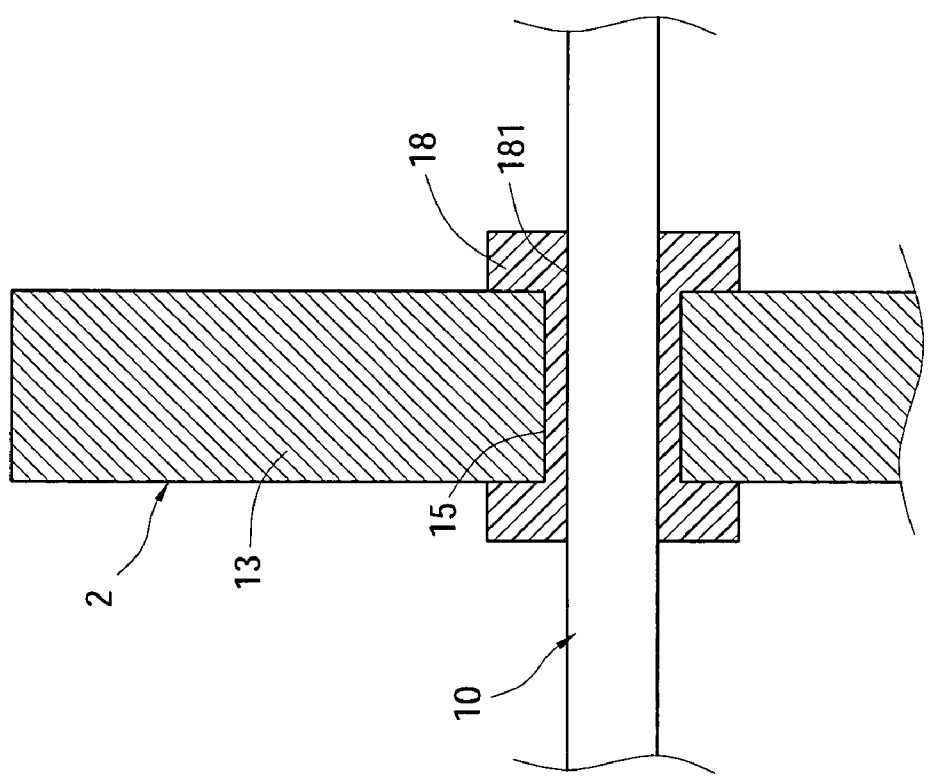
FIG. 5 is a cross-sectional view of the portion around the fastening member of an CCFL assembly according to a second preferred embodiment of the invention.

Referring to FIGS. 4 and 5, a fastening member 18 is provided at each of the apertures 19 in the embodiment. The fastening members 18 are adapted to fasten the lamps of the CCFL assembly 10 at the apertures 19. The fastening member 18 comprises a central hole 181 and two end enlargements having an outer diameter larger than an inner diameter of the aperture 19. The inner diameter of the aperture 19 is conformed to an outer diameter of the lamp of the CCFL assembly 10. As such, the lamp of the CCFL assembly 10 can be fastened at the aperture 19 by the friction of the fastening member 18 when the lamp of the CCFL assembly 10 is disposed in the aperture 19.

Figure 6:
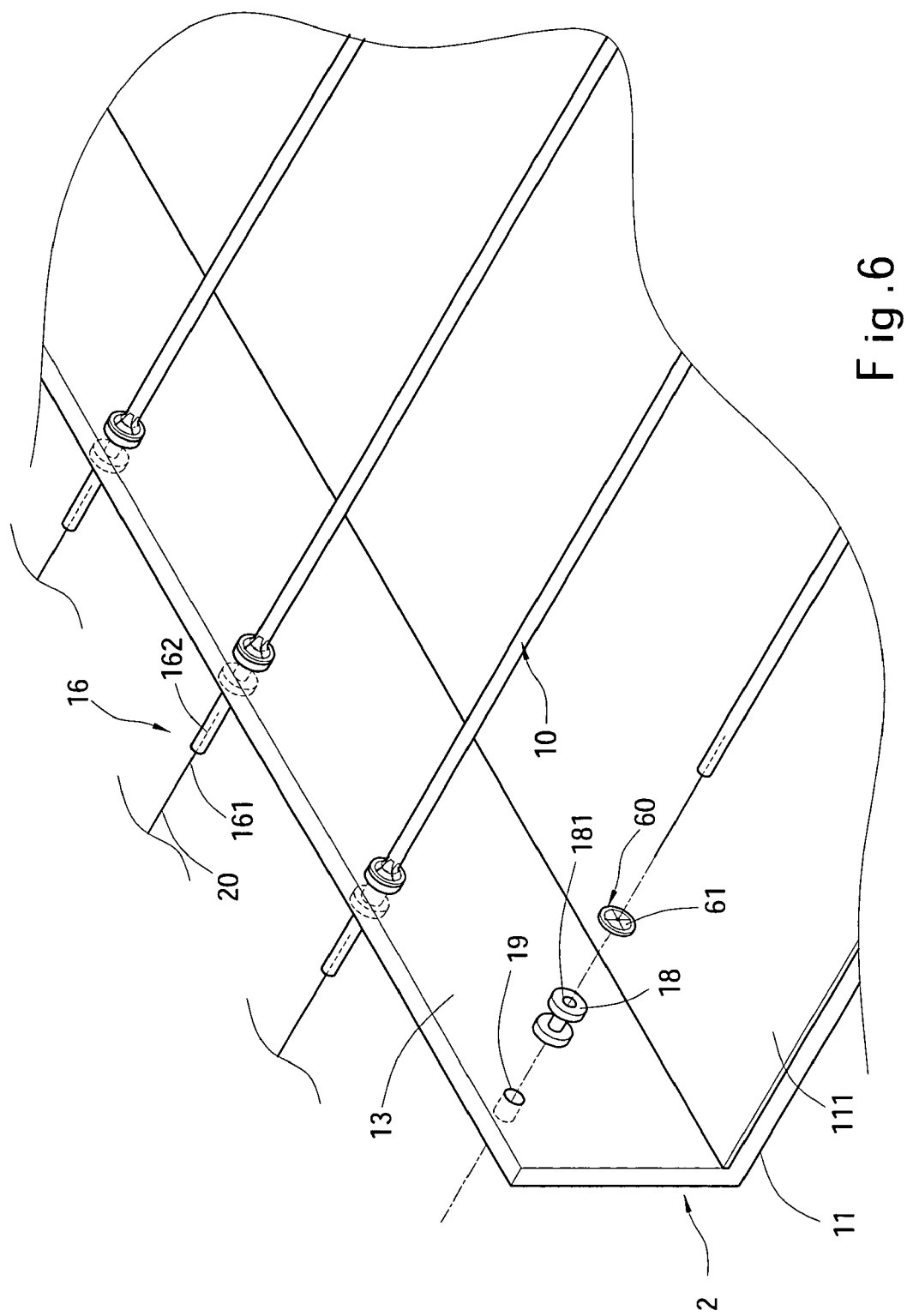
FIG. 6 is a greatly enlarged view of a portion of an CCFL assembly according to a third preferred embodiment of the invention.

Referring to FIG. 6, a circular or polygonal adhering member 60 is provided at the inner end of the fastening member 18. In the embodiment, the adhering member 60 is circular. The adhering member 60 comprises a plurality of equal sectors (four are shown) 61. The sectors 61 are adapted to provide the friction for fastening the lamp of the CCFL assembly 10 as the lamp of the CCFL assembly 10 passes the adhering member 60.

Figure 7A:
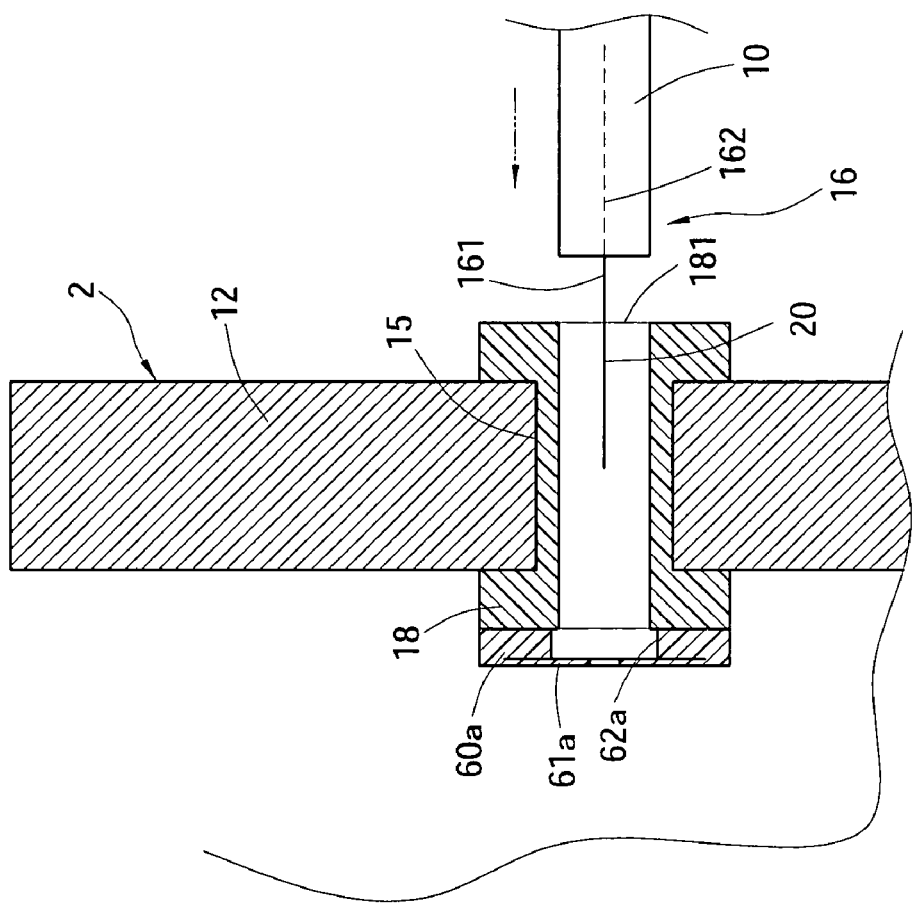
FIGS. 7A, 7B, and 7C are cross-sectional views illustrating the fastening of the lamp at the fastening member.
Figure 7B:
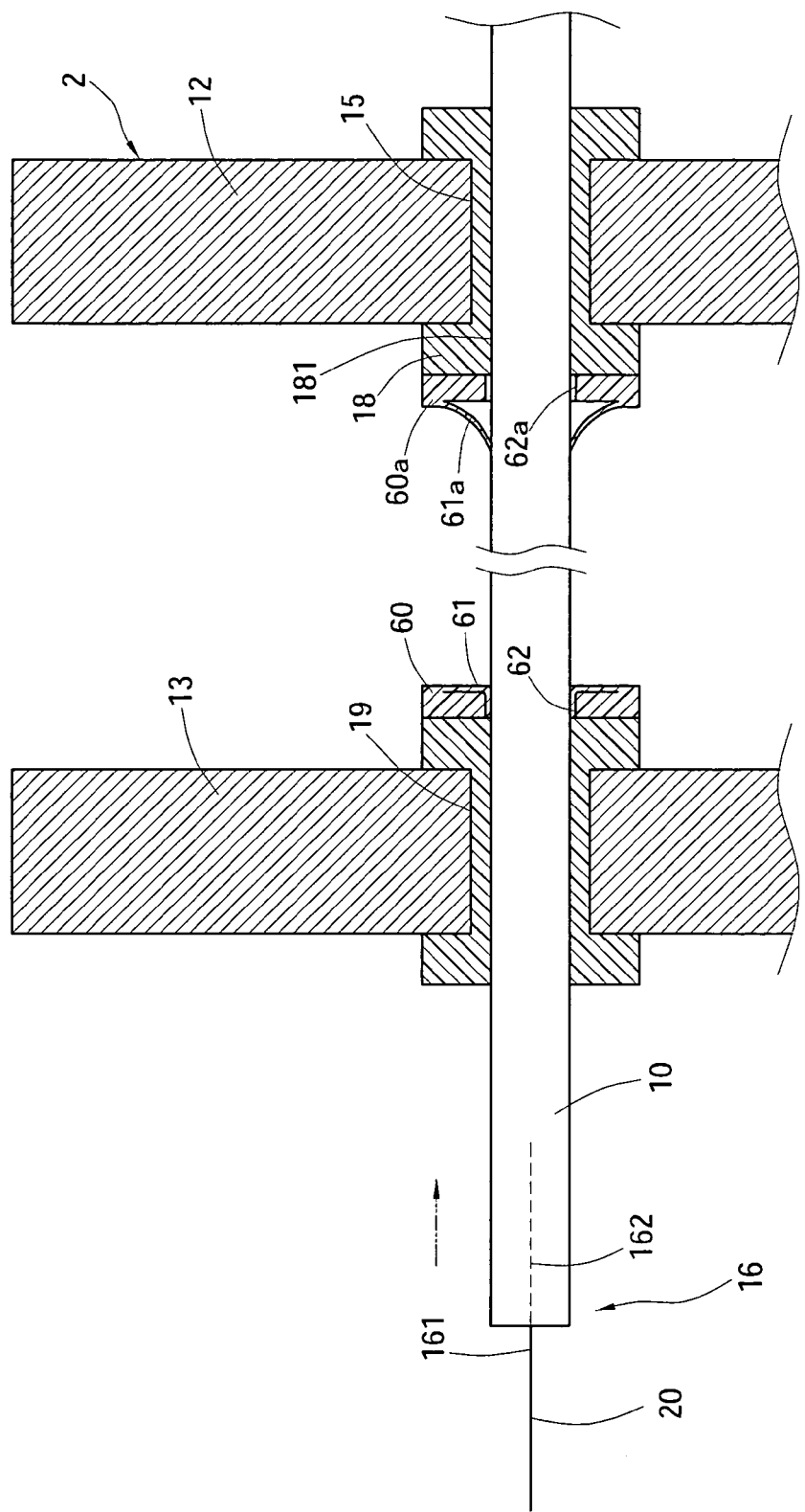
Figure 7C:
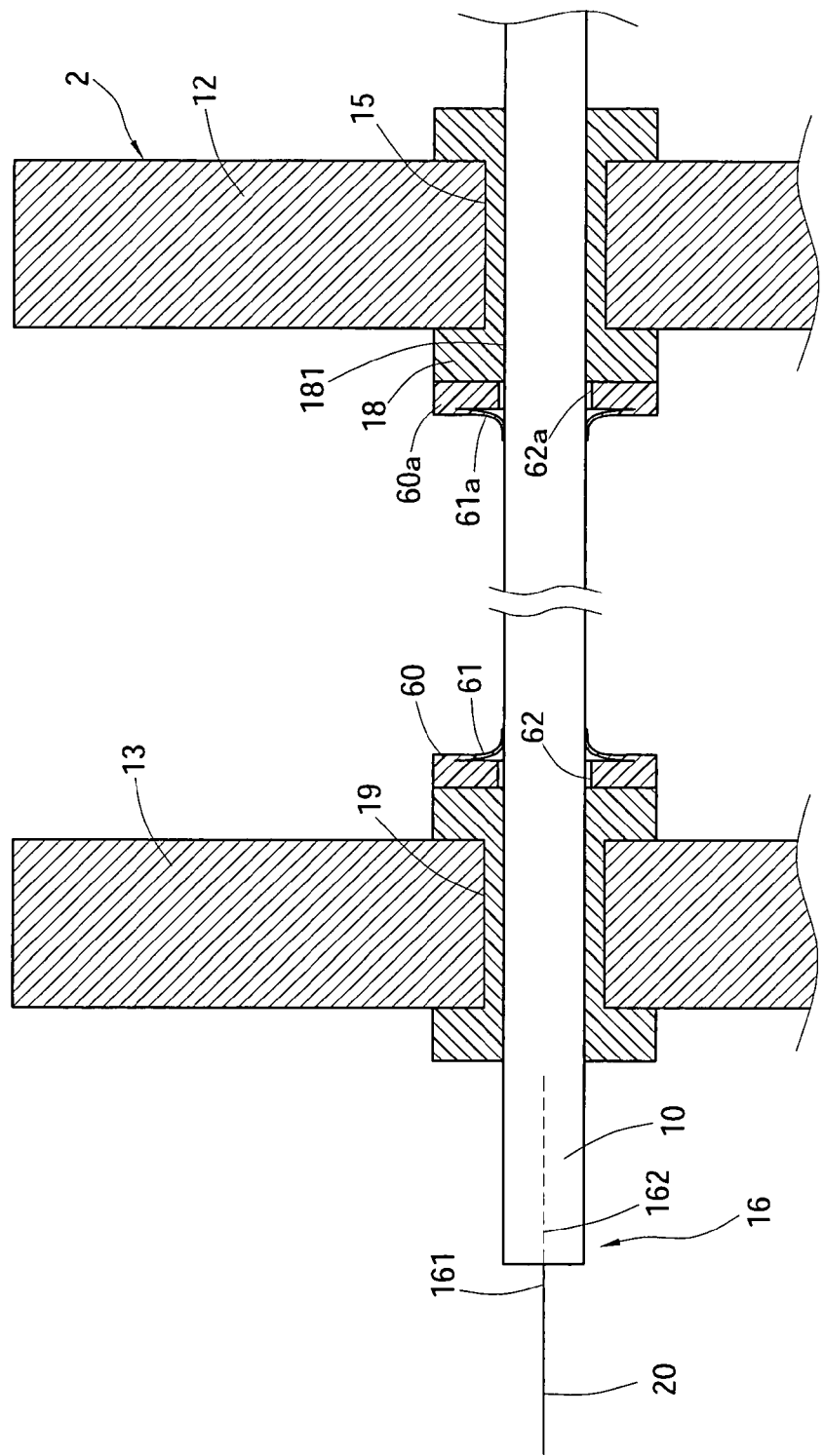
Figure 8:
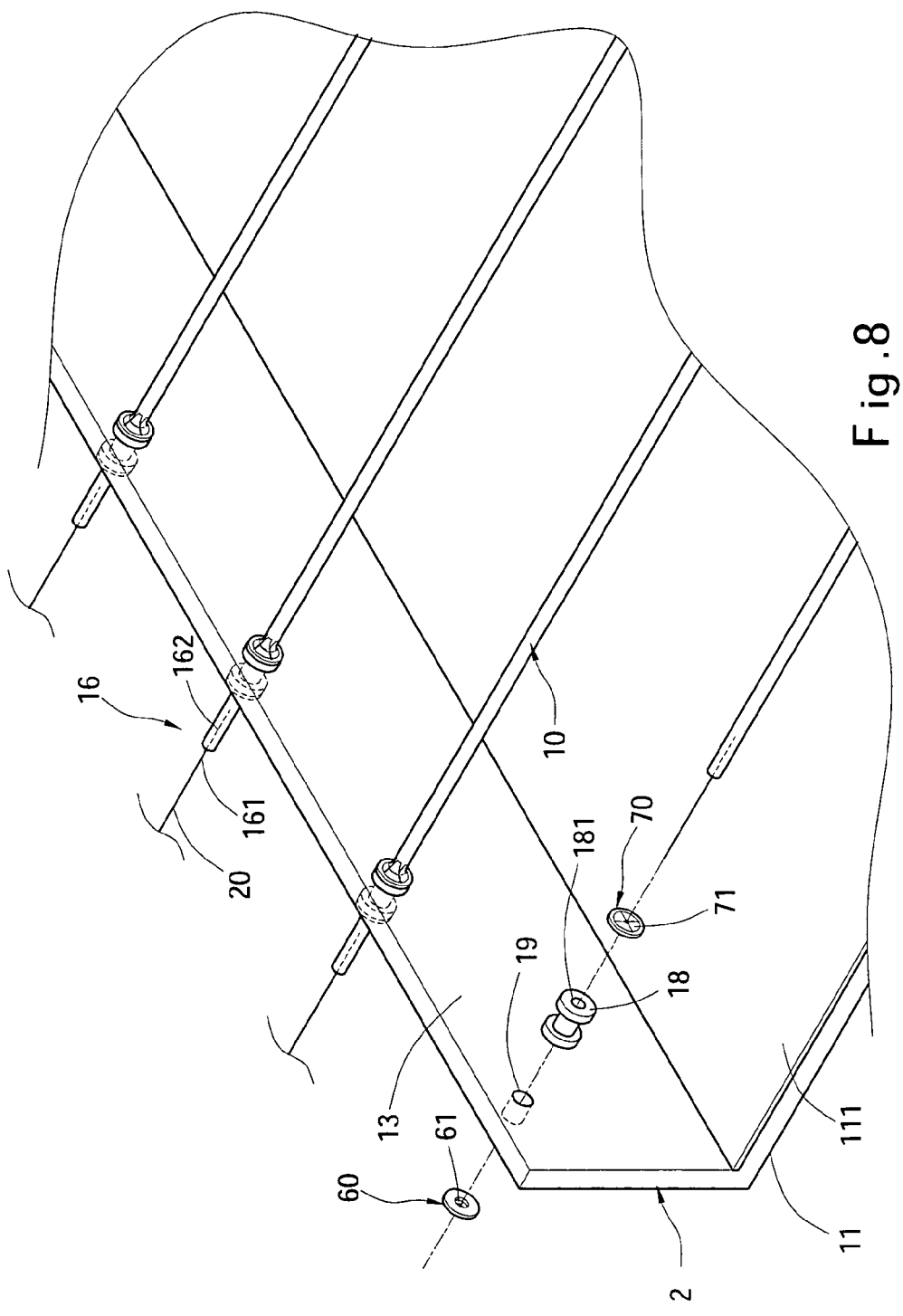
FIG. 8 is a greatly enlarged view of a portion of an CCFL assembly according to a fourth preferred embodiment of the invention.

Referring to FIGS. 7A, 7B, and 7C, an installation of the lamps of the CCFL assembly 10 on the support unit 2 will now be described in detail below. First, insert the lamp of the CCFL assembly 10 through the aperture 15 on the support member 12 by passing the central hole 181 of the fastening member 18. Next, the lamp of the CCFL assembly 10 passes a central opening 62a of the adhering member 60a. Sectors 61a of the adhering member 60a will be opened toward inside of the support unit 2 for disposing around the outer surface of the lamp of the CCFL assembly 10 (i.e., adhered therearound by the friction). Next, the lamp of the CCFL assembly 10 inserts through the aperture 19 on the support member 13 in which central portions of the sectors 61 of the other adhering member 60 are opened to push inside a central opening 62. Next, pull the projected portion of the lamp of the CCFL assembly 10 back toward the support member 13 for pulling the central portions of the sectors 61 of the other adhering member 60 toward inside of the support unit 2 with the open sectors 61 being disposed around the outer surface of the lamp of the CCFL assembly 10 (i.e., adhered therearound by the friction). At this moment, the sectors 61 of the adhering member 60 and the sectors 61a of the adhering member 60a are opposite and are adhered around the lamp of the CCFL assembly 10, resulting in a fastening of the lamp of the CCFL assembly 10. Moreover, an inner diameter of the central opening 62 is conformed to an inner diameter of the lamp of the CCFL assembly 10.

Figure 9:
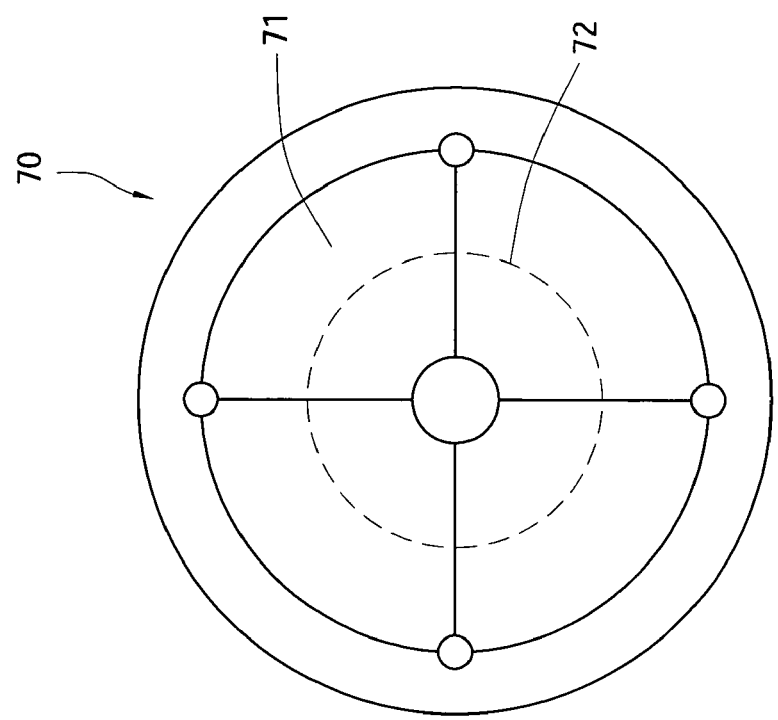
FIG. 9 is a plan view showing two adhering members according to the third preferred embodiment of the invention.
Figure 9:
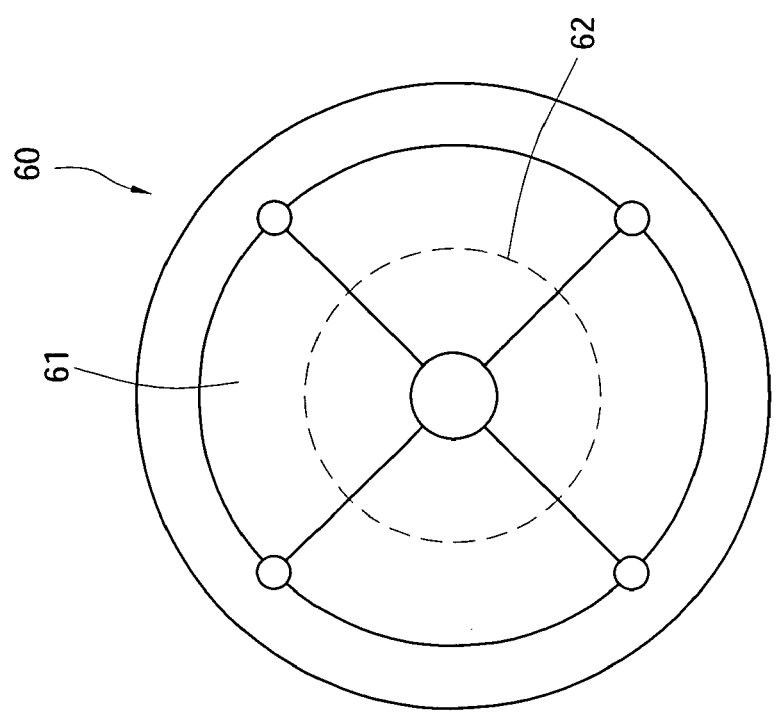
Figure 10A:
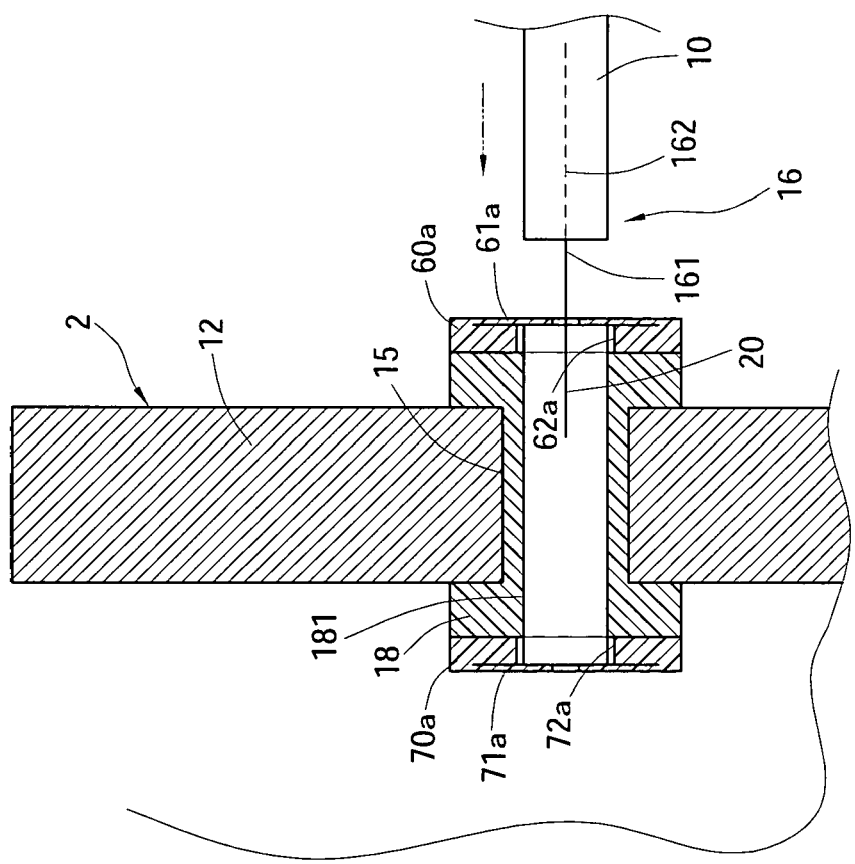
FIGS. 10A, 10B, and 10C are cross-sectional views illustrating the fastening of the lamp at the fastening member according to the fourth preferred embodiment of the invention.
Figure 10B:
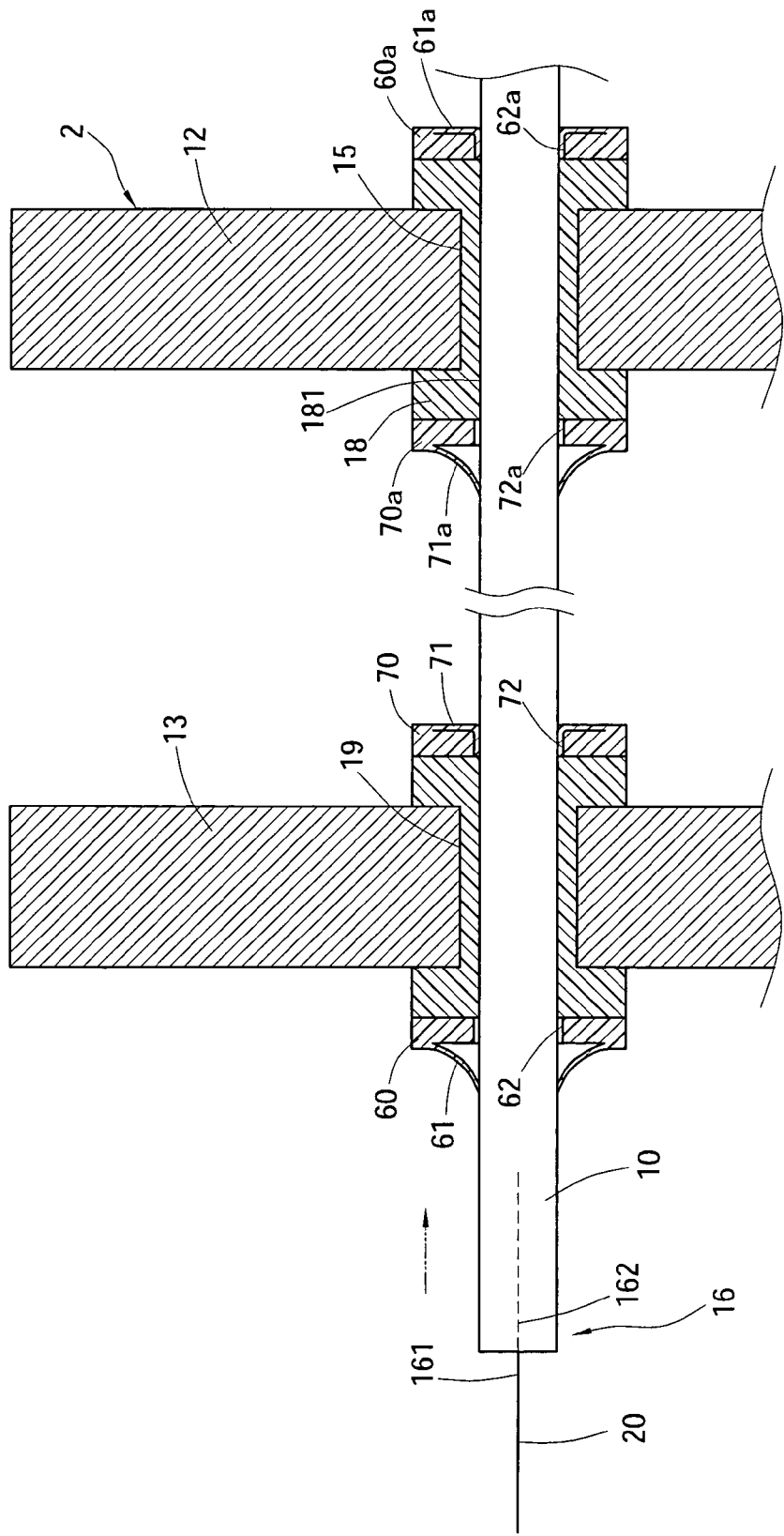
Figure 10C:
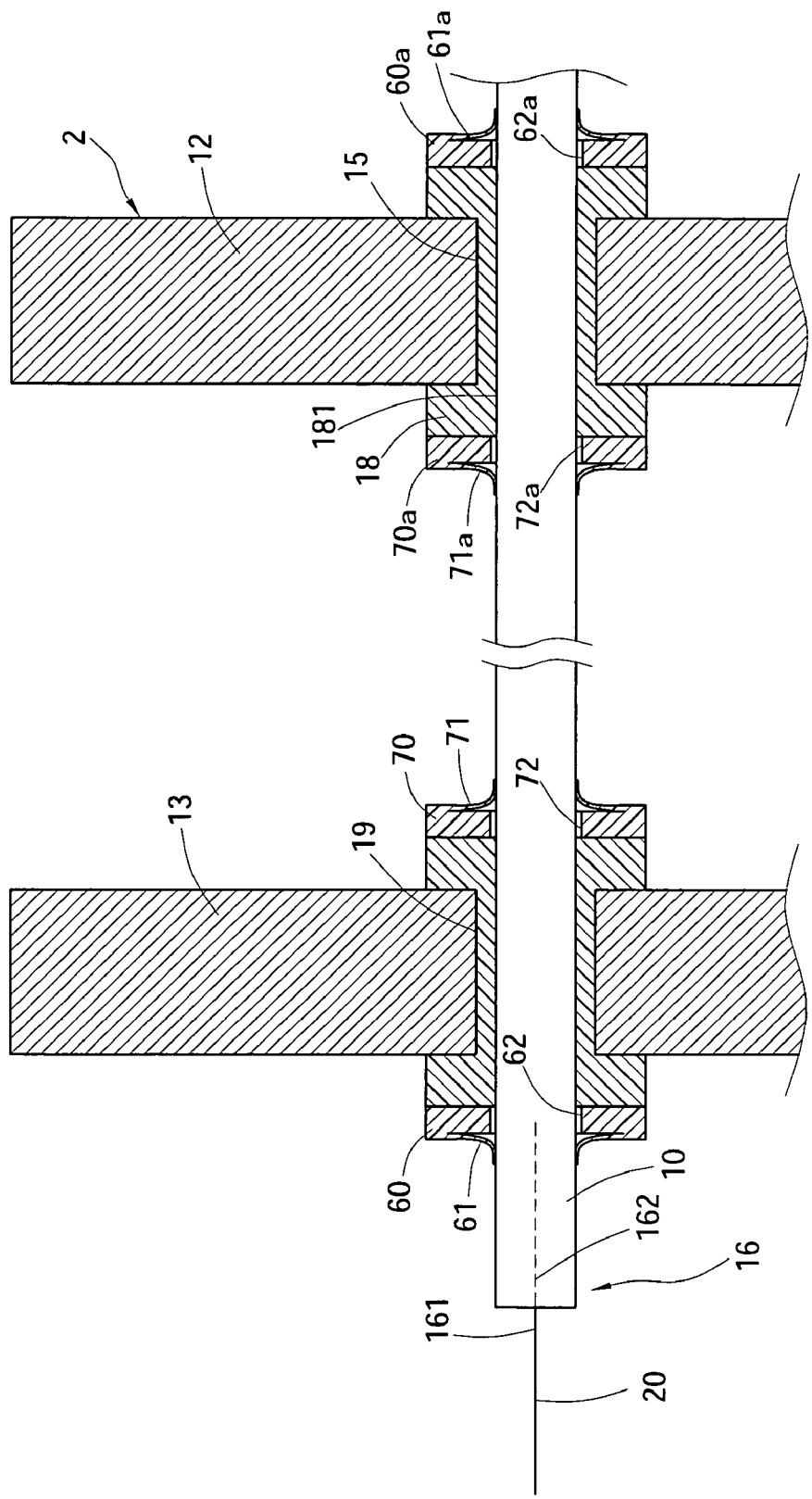

Referring to FIGS. 8, 10A, 10B, and 10C, two adhering members 60a and 70a of thin plate are provided at both ends of the fastening member 18. Each of the adhering members 60a and 70a comprises a central opening 62a or 72a and a plurality of equal sectors (four are shown) 61a or 71a. Also, the orientation of the sectors 61a at one end of the fastening member 18 is different from that of the sectors 71a at the other end thereof (see FIG. 9). The sectors 61a and 71a are adapted to provide friction for fastening the lamp of the CCFL assembly 10 as the lamp of the CCFL assembly 10 passes the adhering members 60a and 70a. Dust adhered on the lamps of the CCFL assembly 10 are prohibited from entering into the frame 1 (i.e., dust are stopped by the sectors 61a and 71a at the fastening members 18) as the lamps of the CCFL assembly 10 pass the fastening members 18 by configuring the orientation of the sectors 61a to be different from that of the sectors 71a.

Figure 11:
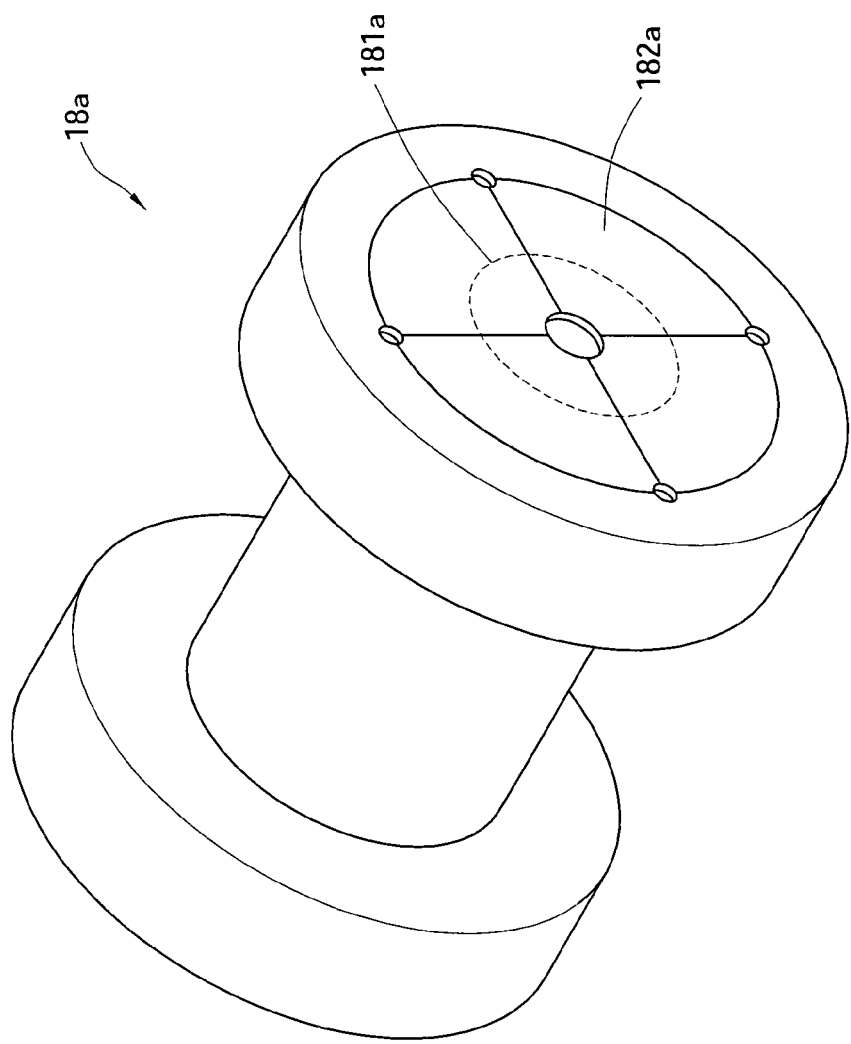
FIG. 11 is a perspective view of a fastening member according to a fifth preferred embodiment of the invention.
Figure 12:
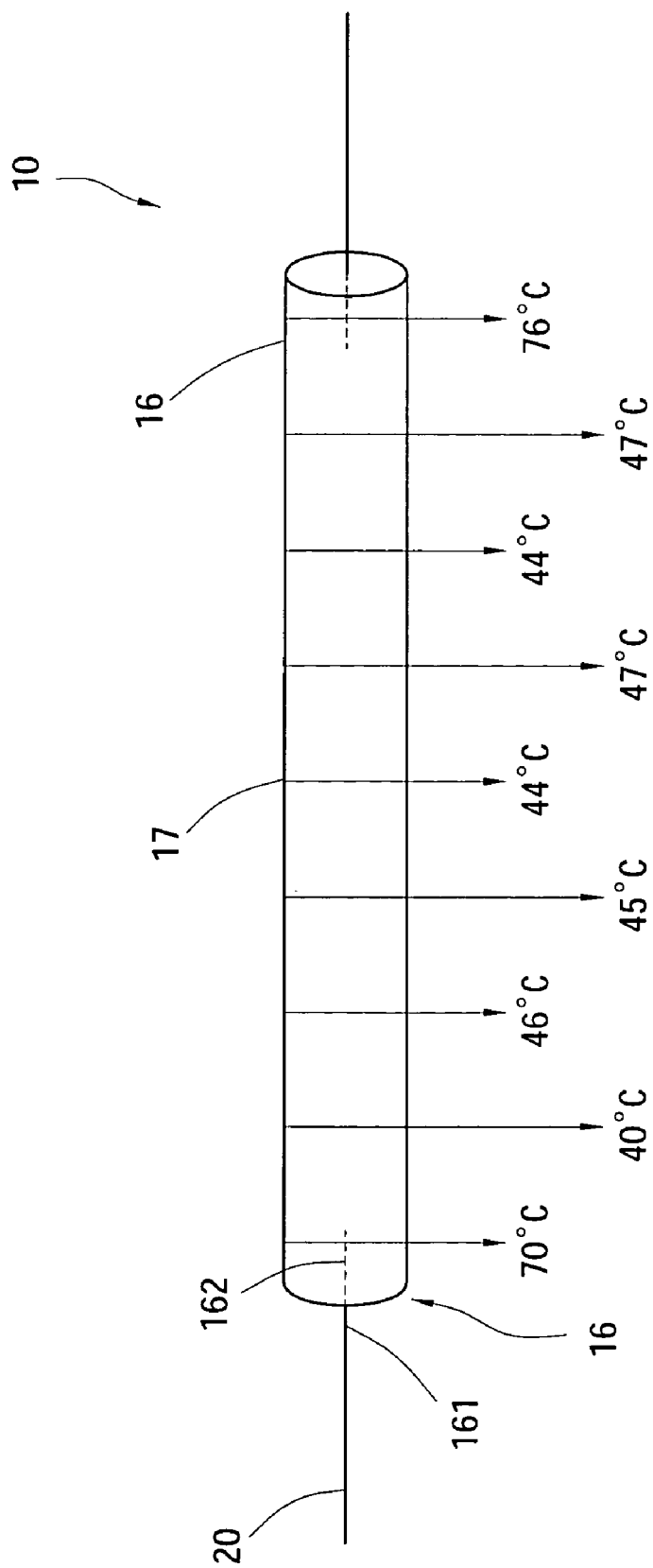
FIG. 12 is a view schematically showing temperature distribution of a lit EL lamp.

Referring to FIG. 11 in conjunction with FIG. 2, another configuration of the fastening member 18a is shown. Four sectors 182a are formed at either end of the fastening member 18a. Also, the sectors 182a and the fastening member 18a are integrally formed. Insert the fastening member 18a through the aperture 15. Next, pass the lamp of the CCFL assembly 10 through the central hole 181a of the fastening member 18a for fastening the lamp of the CCFL assembly 10 by the friction provided by the sectors 182a.

While the invention herein disclosed has been described by means of specific embodiments, numerous modifications and variations could be made thereto by those skilled in the art without departing from the scope and spirit of the invention set forth in the claims.

What is claimed is:

1. A lamp frame having a shape of parallelepiped, comprising:
   a support unit comprising a lower case and two support members on two sides of the lower case, each support member having a plurality of lengthwise spaced apertures;
   an CCFL assembly comprising a plurality of parallel lamps each being supported by a pair of opposite apertures on the support members wherein each of the apertures has an inner diameter larger than an outer diameter of the lamp, and the lamp is divided into a connecting portion projected from the support members and an illumination portion;
   a fastening member at the aperture, and wherein the fastening member comprises two end enlargements having an outer diameter larger than the inner diameter of the aperture; and
   an adhering member at an inner end of the fastening member, the adhering member comprising a plurality of sectors wherein any two adjacent adhering members are divided by a radius so that the sectors are adapted to fasten the lamp by friction as the lamp passes the sectors.

2. The lamp frame of claim 1, further comprising an upper case secured to the lower case by means of a fastener by connecting the upper and the lower cases together for enclosing the CCFL assembly.

3. The lamp frame of claim 1, wherein the adhering member further comprises a central opening adapted to permit the lamp to pass therethrough.

4. The lamp frame of claim 1, wherein the sectors are equal.

5. A lamp frame having a shape of parallelepiped, comprising:
   a support unit comprising a lower case and two support members on two sides of the lower case, each support member having a plurality of lengthwise spaced apertures;
   an CCFL assembly comprising a plurality of parallel lamps each being supported by a pair of opposite apertures on the support members wherein each of the apertures has an inner diameter larger than an outer diameter of the lamp, and the lamp is divided into a connecting portion projected from the support members and an illumination portion;
   a fastening member at the aperture and wherein the fastening member comprises two end enlargements having an outer diameter larger than the inner diameter of the aperture; and
   two adhering members at both ends of the fastening member, each of the adhering members comprising a plurality of sectors wherein any two adjacent adhering members are divided by a radius so that the sectors are adapted to fasten the lamp by friction as the lamp passes the sectors.

6. The lamp frame of claim 5, wherein the adhering member further comprises a central opening adapted to permit the lamp to pass therethrough.

7. The lamp frame of claim 6, wherein the sectors are equal.

8. The lamp frame of claim 6, wherein an orientation of the sectors at one end of the fastening member is different from that of the sectors at the other end thereof.

9. The lamp frame of claim 6, wherein the sectors and the fastening member are integrally formed.

10. The lamp frame of claim 6, further comprising an upper case secured to the lower case by means of a fastener by connecting the upper and the lower cases together for enclosing the CCFL assembly.

* * * * *